United States Patent [19]

Kuts

[11] 4,069,729
[45] Jan. 24, 1978

[54] FABRIC CUTTER

[75] Inventor: Mathew Kuts, Akron, Ohio

[73] Assignee: The B. F. Goodrich Company, Akron, Ohio

[21] Appl. No.: 724,138

[22] Filed: Sept. 17, 1976

[51] Int. Cl.$^2$ .................. B23D 19/02; B26D 1/20
[52] U.S. Cl. ........................................ 83/488; 83/337;
83/508; 83/596; 83/614; 83/676; 83/925 CC
[58] Field of Search ............ 83/477.1, 925 CC, 647.5,
83/559, 564, 596, 614, 623, 676, 694, 488, 508,
455, 483, 485, 487, 331, 332, 329

[56] References Cited

U.S. PATENT DOCUMENTS

| | | | |
|---|---|---|---|
| 1,156,224 | 10/1915 | Harwood | 83/485 X |
| 2,638,856 | 5/1953 | Hubbard | 83/487 X |
| 3,924,503 | 12/1975 | Kuts | 83/488 |

FOREIGN PATENT DOCUMENTS

| | | | |
|---|---|---|---|
| 421,759 | 1/1911 | France | 83/329 |

*Primary Examiner*—Willie G. Abercrombie
*Attorney, Agent, or Firm*—Joseph Januszkiewicz

[57] ABSTRACT

Bias cutting of rubberized fabric material having high strength material embedded therein, wherein a carriage is reciprocated on a support frame, which frame may be adjusted angularly to determine the bias angle of cut. A cutter support is mounted on the carriage for movement therewith. Such cutter support journals for rotation a shaft that supports on one end a rotating cutter mounted off-center. The cutter cooperates with an anvil carried by the cutter support to shear the fabric material. A guide is located adjacent to the anvil for supporting the anvil. Such guide supports material that moves over it. Upon completion of the cut the cutter, anvil and its supporting framework is pivoted out of the way to permit the indexing of the material and the return of the cutter and anvil during such indexing to the starting position in preparation for the succeeding cutting operation.

5 Claims, 6 Drawing Figures

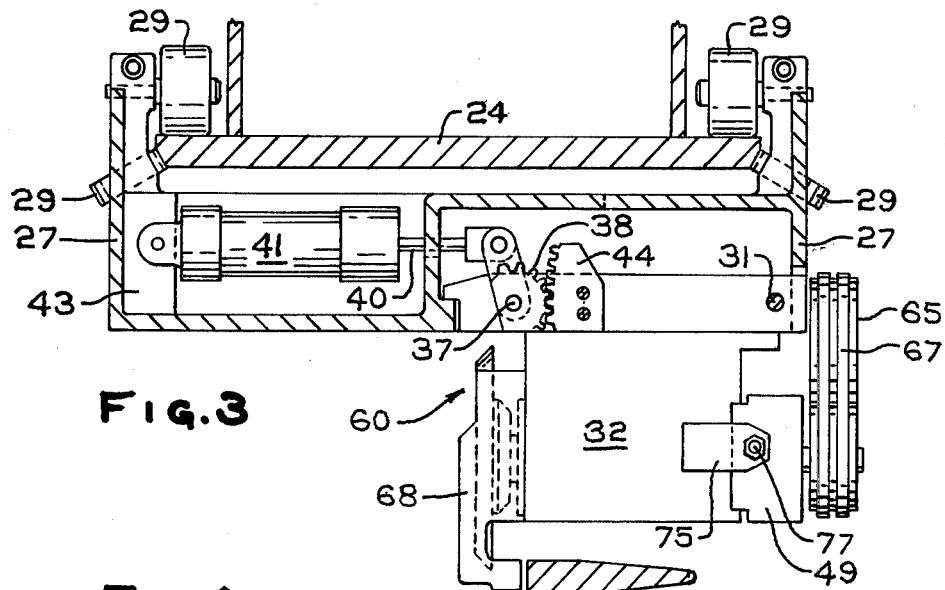
FIG.3
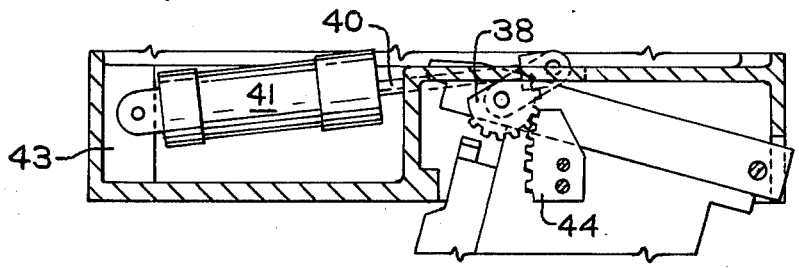
FIG.4
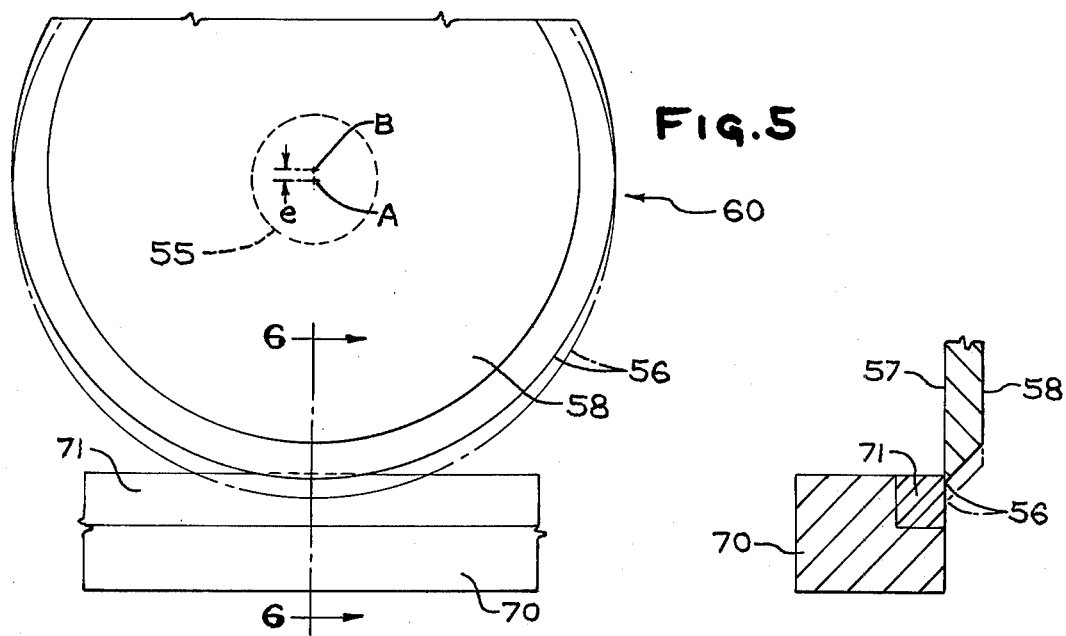
FIG.5
FIG.6

FABRIC CUTTER

BACKGROUND OF THE INVENTION

This invention relates to pneumatic tire manufacture and more particularly to a cutting apparatus for cutting ply stock material which is employed in the construction and manufacture of pneumatic tires.

In the manufacture of pneumatic tires, one of the principal members used to build the tire carcass is a thin sheet of uncured rubber-like material known as a fabric, building ply or ply stock. In the manufacture of such ply stock, parallel cords of fabric, wire cord or high strength cord such as Kevlar cord are passed through a pair of rolls in cooperation with calendering rolls which work and calendar unvulcanized rubber onto the parallel cords as they pass through the pinch rolls to form a continuous sheet of material with the parallel strands of cord embedded therein and running in a direction that is parallel to the longitudinal centerline of the material. Thereafter, such sheet material is bias cut into sections of fabric which are then spliced together to make a building ply or ply stock with cords therein located at a desired bias angle relative to the longitudinal centerline of the ply stock. Such stock or ply stock may also be at a ninety degree angle to the longitudinal centerline of the ply stock formed; however, for purpose of this description and example, the invention will be described wherein the cords are at some small acute angle relative to the longitudinal centerline of the ply stock. Layers of ply stock are applied to a tire building drum in such a manner that cord members of overlapping plies crisscross with respect to the cord members above or below. The tire beads are then set against the ends of the ply stock and the plies are turned thereover. Additional plies, chafer strips, sidewall strips, breakers, overhead belts and a tread ply may be applied in varying orders, and stitched thereto. Such carcass is substantially a flat band, wherein the angle is measured between the cords and the circumferential line around the crown of the tire. In the case of conventional bias ply pneumatic tires, this may be approximately 60°. However, this apparatus can cut fabric material with strands of Kevlar cord therein which make a small acute angle with the circumferential centerline of the tire. After the removal of such green tire, the tire is given a torodial shape during vulcanization or on a second machine prior to vulcanization, wherein the angle after vulcanization will change depending on many factors including drum set. The above description has generally referred to tires manufactured from fabric, however, the present invention is also directed to building plies which use nonextensible cord materials such as nylon, Kevlar cord and wire. In the processing of ply stock containing Kevlar cord, processing has been difficult because of tremendous strength of the material, which cutting is particularly compounded by the very low bias angle cutting on such stock wherein the cutters tend to fray the ends of the Kevlar cord, which action interferes with the splice to be effected. This apparatus can also cut stock which has zero bias angle.

In bias cutting rubberized fabric the conventional way of cutting is to use a pair of fingers that lift the fabric away from the conveyor belt on which it travels, so that a rapidly rotating cutter disk is above the fingers but is cooperative therewith to cut the fabric. The application of this conventional apparatus to cut rubberized Kevlar cord fabric including fabric for radial tires is difficult and unsatisfactory. The rotating cutter of the present invention is mounted off-center giving the rotating cutter a shearing action on the rubberized fabric material as the cutter is moved transversely across the material in cooperation with a linearly movable anvil that is supported in its movement to assure a firm cutting action during the shearing cut. Upon the completion of a cut across the fabric material, it is desirable to move the cutter and anvil out of the way so that as the cutter and anvil are returned to their starting position the fabric material can be advanced or indexed to the next position in preparation for the succeeding cut.

SUMMARY OF THE INVENTION

The present invention contemplates an apparatus that utilizes a carriage which is mounted on a support frame for reciprocal movement on a guideway. The support frame may be adjusted for the bias angle to be cut, or it may be adjusted for zero bias angle. A cutter support member carrying a cutter and its cooperative anvil is mounted on the carriage for movement therewith. The anvil is supported by the cutter housing in its reciprocal movement. Means are provided to pivot the cutter and the cutter support member along with the anvil out of the way so that as the cutter and anvil can be returned to the original starting position while the fabric material to be cut is indexed in preparation for the next cut. The rotating circular cutter is eccentrically mounted so that its rotating edges cooperates with the anvil to provide a downward shearing action in cooperation with the traveling anvil, which anvil is supported by the cutter support.

BRIEF DESCRIPTION OF THE DRAWINGS

FIG. 3 is a cross-sectional view of the carriage and cutting means taken along lines 3—3 of FIG. 2.

FIG. 4 is a fragmentary cross-sectional view of a portion of the carriage and cutter support showing the cutting support elevated.

FIG. 5 is a side elevational view of the rotary cutter and a portion of the anvil.

FIG. 6 is an enlarged cross-sectional view of a portion of the cutter and anvil taken along lines 6—6 of FIG. 5.

DETAILED DESCRIPTION

Figure 1:
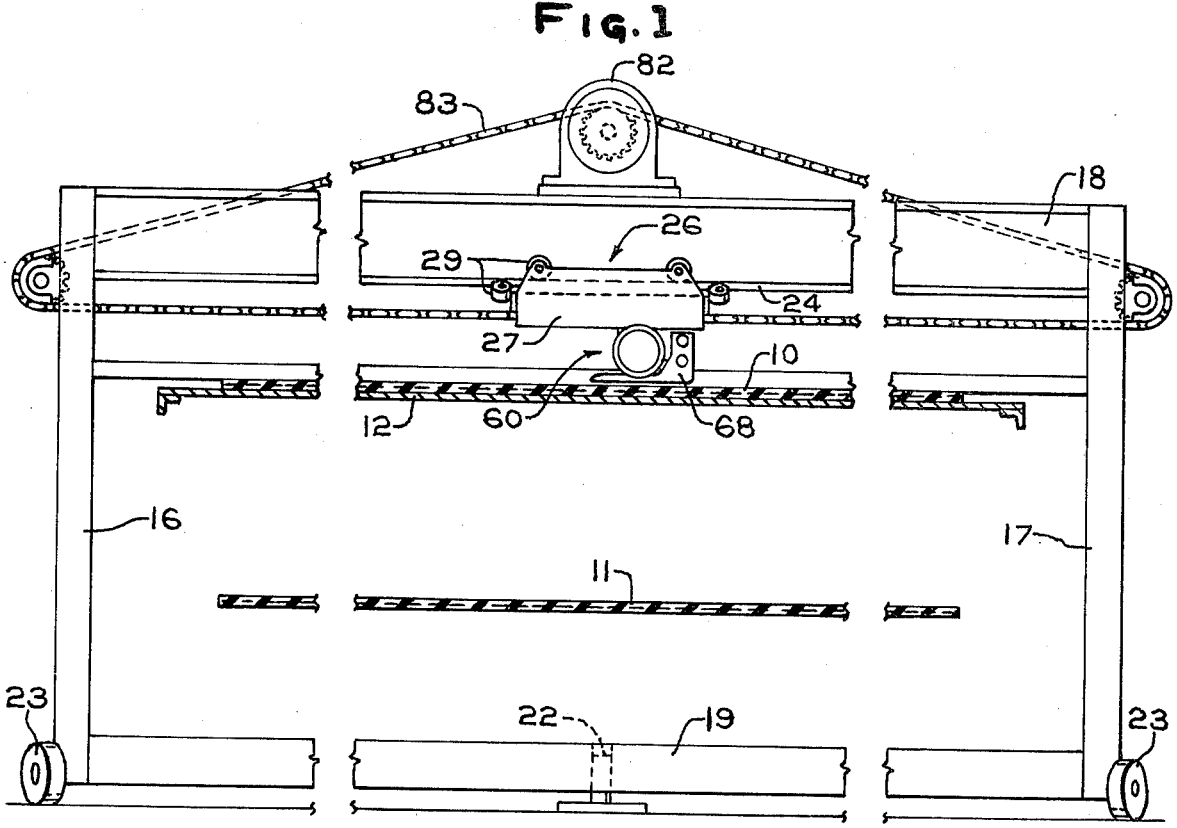
FIG. 1 is a front elevational view of a bias cutting apparatus with a portion of the conveyor shown.
Figure 2:
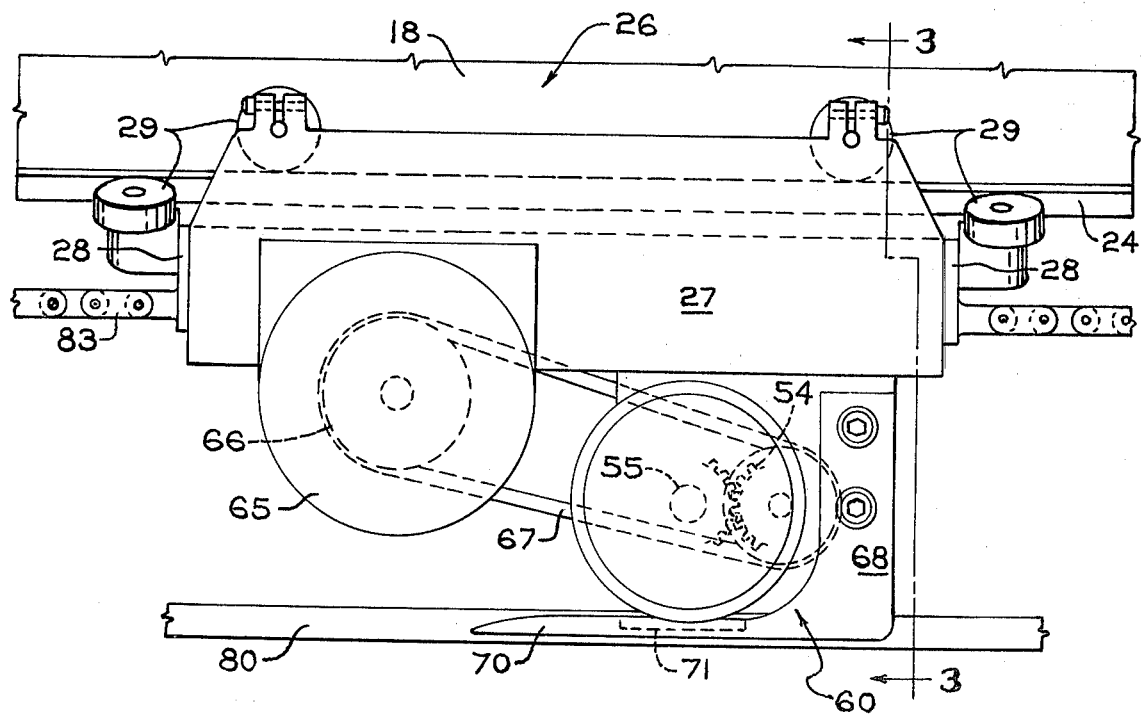
FIG. 2 is an enlarged elevational view of the carriage, cutter support, anvil and a portion of the guide bar.

Referring to the drawings wherein like reference characters designate like or corresponding parts throughout the several views, there is shown in FIG. 1 an endless conveyor belt that is suitably supported at spaced ends thereof by suitable rollers driven in a manner old and well-known in the art. The conveyor belt has an upper conveying run 10 and a lower return 11. Suitable guide and support means are provided to guide the belt in its travel, including an upper plate 12 to support upper run 10. Supporting framework shown generally in FIG. 1 includes a pair of spaced upwardly extending support members 16 and 17 with suitable supports including an upper cross support or I-beam 18 and a lower cross support 19. Lower support 19 has a pivot mounting 22 at its intermediate lower portion suitably journaled in the floor of the installation, about which the support framework can be pivotally adjusted. A plurality of spaced rollers 23 are suitably mounted on respective lower end portions of the supporting framework to facilitate the angular adjustment of the supporting frame and the bias cutting apparatus to be described. Cross support 18 extends across the entire width of the bias cutting apparatus and as shown in FIG. 3 supports a guideway or guideway member 24 having a plurality of ways thereon. Mounted for reciprocal movement on guideway 24 is a carriage means 26 which includes side plates 27—27 and end plates 28—28 (FIG. 2). Suitably journaled on carriage means 26 are a plurality of rollers 29 which rollingly engage the ways on guideway 24 to maintain carriage means 26 thereon and guide the reciprocal movement of the carriage means 26 on the ways of the guideway 24. Journaled on the lower one end portion of end plates 28—28 of carriage means 26 is a rod or shaft 31 for pivotally supporting a cutter support member 32. Cutter support member 32 has a pair of bosses integral therewith each having aligned bores in which is journaled a shaft 37. Shaft 37 has a pair of spur gears 38 (only one shown) suitably keyed to the respective end portion thereof. Shaft 37 supports a clevis for pivotal attachment to the rod end of piston rod 40 of a pneumatic cylinder 41. The head end of pneumatic cylinder 41 is pivotally attached to a bracket means 43 which is part of the side plate 27 of carriage means 26. The spur gears 38 meshingly engage stationary gear segments 44 (only one shown) that are rigidly secured to the respective end plates 28—28 of carriage means 26. Upon actuation of the head end of cylinder 41, piston rod 40 is extended from the piston shown in FIG. 3 to that shown in FIG. 4 whereby the spur gears 38 rotate clockwise as shown in FIG. 3 pivoting the cutter support member 32 in a clockwise direction (as viewed in FIG. 3) about shaft 31 for a purpose to be described.

The lower portion of cutter support member 32 is centrally recessed to provide guideways which support an adjustable block 49. A motor 65 suitably secured to carriage means 26 has its output shaft connected to a sheave 66 which is in alignment with sheave 54. Sheave 54 has its output connected via suitable gears to drive shaft 55. A V-belt 67 is trained about sheaves 66 and 54, to provide the transfer of power from motor 65 to shaft 55 on which a circular cutter 60 is eccentrically mounted. The center of shaft 55 is designated as "A" in FIG. 5, while the center of cutter 60 is designated as "B". The amount of eccentricity between centers A and B is designated as "e"; however, the eccentricity of the cutter relative to anvil 70 is twice this. The eccentric mounting of the cutter 60 on shaft 55 gives the cutter 60 a rapidly rotating shearing action relative to the anvil. As seen in FIG. 6, the circular cutting edge 56 of the cutter 60 has a downward direction relative to the insert 71 of anvil 70, which is a rapidly rotating shearing action as the cutter is moved linearly across the fabric material supported by a guide bar to be described. As seen in FIGS. 5 and 6, the cutting edge 56 lies in a plane that contains one planar side surface 57 of cutter 60 while the edge 56 tapers inwardly toward the other planar side surface 58 of cutter 60. Suitably secured to cutter support member 32 is an L-shaped bracket member 68 with its lower end portion having a laterally horizontally extending anvil 70 that is suitably recessed to receive an insert 71 which may be made of carbide.

Cutter support member 32 has bracket means 75 suitably secured thereto, which bracket means 75 has bores therein threadedly engaged by set screws 77. The respective end portions of set screws 77 abuttingly engage the block 49 to adjust its lateral position on the guideways 48 in the cutter support member 32. Such block 49 may carry self-aligning bearing to permit the adjustment of block 49 by set screws 77. The anvil 70 is moved parallel to the edge of a guide bar 80 over which the fabric material moves while the upper conveying run 10 moves under the bar 80.

The intermediate upper portion of I-beam 18, as shown in FIG. 1, supports a variable speed motor 82 having its output connected to a sprocket chain 83 which in turn is connected to carriage 26 and controls the reciprocation of the carriage on the guideway member 24 by suitable controls and limit switches old and well-known in the art.

In the operation of the apparatus described, the fabric material is advanced over the guide bar 80 by the upper conveying run 10 and, after sufficient material has advanced, the conveyor is stopped in preparation for the cutting of the fabric. Upon stopping of the conveyor belt, motor 82 is energized which thereby moves carriage 26 across guide bar 80 while cutter 60 is rotated at a high speed through the output of motor 65 which transfers its output to the V-belt 67 and thence to shaft 55. The cutting edge 56 of the eccentrically mounted cutter 60 is parallel to the cutting edge of anvil 70 and substantially abutting the side surface thereof as seen in FIG. 6. The cutting edge of cutter 60 performs a snipping action which is a downward movement of the linear cutting edge across the fabric due to its eccentric mounting, such that the Kevlar cords embedded in the fabric are cut effectively without fraying the ends thereof as the carriage 26 is moved linearly across the fabric to be cut. Upon completion of the cut, motor 82 is denergized and the head end of cylinder 41 is pressurized, which action rotates the shaft 37 and spur gears 38 which mesh with stationary gear segments 44. Such action causes the gears 38 to roll up gear segment 44, pivoting the cutter support 32, along with the cutter 60 and anvil 70 out away from the guide bar 80 about shaft 31 to permit the advancement of the fabric material as the carriage 26 is returned to its initial starting position by motor 82 through suitable limit switches and controls old and well-known in the art. Upon return of the carriage to its initial starting position, the rod end of cylinder 41 is pressurized and returns the cutter support member 32 and anvil 70 to the lowered position such that anvil 70 is in engagement, a position relative to the cutter 60 and the guide bar 80 for the next succeeding cut.

Various modifications are contemplated and may obviously be resorted to by those skilled in the art without departing from the described invention, as hereinafter defined by the appended claims, as only a preferred embodiment thereof has been disclosed.

I claim:

1. A bias cutting apparatus for cutting rubberized fabric comprising a support frame, a carriage mounted on said support frame for reciprocal movement, drive means connected to said carriage for reciprocating said carriage, a cutter support member pivotally secured to said carriage, a cutter means journaled eccentrically on said cutter support member for rotation thereon, power means mounted on said carriage operatively connected to said cutter means for continuously rotating said cutter means eccentrically, said cutter means having a circular cutting edge, said circular cutter having a pair of spaced side portions, said cutting edge tapering towards one of said side portions, a guide bar secured to the lower portion of said support frame over which fabric is moved and under which a conveyor belt travels, anvil means mounted on said cutter support member for movement therewith, said anvil means having a linear cutting edge, said circular cutting edge having a portion of the other of said side portions adjacent to said linear cutting edge of said anvil means, and power operated means interconnecting said carriage and said cutter support member for pivoting said cutter support member on said carriage to move said cutter support member and anvil away from said guide bar to facilitate the movement of fabric while said cutter support member and carriage are moved back for a subsequent cutting of the fabric.

2. A bias cutting apparatus as set forth in claim 1 wherein said cutter means maintains sliding contact with said linear cutting edge of said anvil, and said pivotal mounting of said cutter support member on said carriage includes a rod for pivoting said anvil in an arcuate direction about said rod and away from said guide bar.

3. An apparatus for the cutting of elastomeric fabric material comprising a support frame, guide means on said support frame, carriage means mounted for movement on said guide means, power operated means operatively connected to said carriage means for reciprocating said carriage means on said guide means, cutter support means mounted on said carriage means for movement therewith, said cutter support means having a shaft journaled thereon for rotation, a circular cutter eccentrically mounted on said shaft for rotation therewith, drive means operatively connected to said shaft for rotating said shaft and said circular cutter, said cutter having a continuous circular cutting edge, a guide bar secured to the lower portion of said support frame and extending transversely thereacross operative to guide fabric to be cut thereover, anvil means connected to said cutter support means for movement therewith, said anvil means having a linear cutting edge, said circular cutting edge having a portion thereof in sliding contact with said anvil at all times, said circular cutting edge lies in a plane that is parallel to said linear cutting edge to perform a shearing action on fabric, and said circular cutter and said carriage is pivotable away from said guide bar in a vertical direction relative to said guide bar.

4. An apparatus as set forth in claim 3 wherein said circular cutter has a pair of spaced side surfaces, one of said cutting side surfaces is in sliding contact with said anvil, and said cutting edge tapering inwardly toward the other of said pair of spaced side surfaces, and power operated means interconnecting said carriage means and said cutter support means for selectivity pivoting said cutter support means upon actuation of said power operated means.

5. An apparatus for cutting of elastomeric fabric material including a cutter support means, a shaft journaled in said support means for rotation, a circular cutter having a bore therein offset from the center of said cutter, said shaft receiving said bore to provide an eccentric mounting of said cutter on said shaft, means securing said cutter to said shaft for simultaneous rotation, drive means on said cutter support means connected to said shaft for rotating said shaft and said cutter continuously and simultaneously about the center of said shaft during the cutting of the material.

* * * * *